United States Patent [19]

Theurer

[11] Patent Number: 5,799,871
[45] Date of Patent: Sep. 1, 1998

[54] SPRAY NOZZLE WITH DISCRETE OPEN/ CLOSE DEADBAND AND METHOD THEREFOR

[75] Inventor: Richard S. Theurer, Asbury, N.J.

[73] Assignee: Hago Industrial Corp., Mountainside, N.J.

[21] Appl. No.: 614,515

[22] Filed: Mar. 13, 1996

[51] Int. Cl.$^6$ ............................................. B05B 1/32
[52] U.S. Cl. ............... 239/1; 239/533.2; 239/590.5; 239/572; 431/3; 431/247; 137/538; 137/540; 137/536; 137/510
[58] Field of Search ................... 431/247, 3, 29, 431/119; 239/572, 570, 575, 583, 584, 533.2; 137/510, 509, 536, 529, 514, 540, 538

[56] References Cited

U.S. PATENT DOCUMENTS

| | | | |
|---|---|---|---|
| 2,621,077 | 12/1952 | Pieroni | 239/570 |
| 2,625,437 | 1/1953 | Huntington | 239/575 |
| 2,639,194 | 5/1953 | Wahlin | 239/575 |
| 2,921,742 | 1/1960 | Johnsyn, Jr. | 239/570 |
| 2,954,172 | 9/1960 | Grundman | 239/570 |
| 3,804,333 | 4/1974 | Kramer et al. | 431/6 |
| 4,197,995 | 4/1980 | Campbell et al. | 239/74 |
| 4,763,843 | 8/1988 | Bombis et al. | 239/571 |
| 5,269,499 | 12/1993 | Schwab . | |
| 5,323,807 | 6/1994 | Gauld et al. | 137/543.15 |

*Primary Examiner*—Carl D. Price
*Attorney, Agent, or Firm*—Robert J. Harter

[57] ABSTRACT

A valved nozzle for spraying fuel oil and method therefor includes an inlet, a discharge chamber downstream of the inlet, and a flow restricting orifice downstream of the discharge chamber. The pressure in both the inlet and the discharge chamber urges the valved spray nozzle to open. The valved spray nozzle abruptly opens by the inlet pressure rising above a predetermined upper pressure limit and abruptly closes upon falling to a lower limit. The span between the upper and lower limits defines a very definite deadband across which leakage is avoided at intermediate pressures.

1 Claim, 3 Drawing Sheets

SPRAY NOZZLE WITH DISCRETE OPEN/ CLOSE DEADBAND AND METHOD THEREFOR

BACKGROUND OF THE INVENTION

1. Field Of The Invention:

The subject invention generally pertains to fuel oil spray nozzles, and more specifically to a spray nozzle incorporating a valve.

2. Description Of Related Art:

Conventional valved nozzles generally function as a check valve coupled to the discharge of a pump. When the pump turns on, fuel oil passes through the valve and is sprayed by the nozzle into a combustion chamber. The valve closes when the pump turns off. With such systems, however, numerous problems arise.

For example, heat from the combustion chamber, reflected back to the valved nozzle, causes a buildup of pressure between the check valve and the pump. This pressure often causes the check valve to leak and drip fuel oil to the bottom of the combustion chamber. In addition, when a check valve does not have clear discrete pressure trip points at the open and closed positions, leakage can occur at transitional pressures midway between fully open and fully closed.

SUMMARY OF THE INVENTION

To overcome the limitations of conventional nozzles employing check valves, it is a primary object of the invention to use a flow restricting orifice to develop a discharge back pressure that urges the valved nozzle open.

A second object of the invention is to provide a valved nozzle having a discrete deadband between an upper pressure limit and a lower pressure limit, whereby the valved nozzle is fully closed as the inlet pressure increases from the lower limit to the upper limit, and is fully open as the inlet pressure decreases from the upper limit to the lower limit.

A third object is to provide a valved nozzle with a minimum number of components.

A fourth object is to provide a simple means for adjusting the upper limit at which a valved nozzle opens.

These and other objects of the invention are provided by a novel valved spray nozzle having an inlet, a discharge chamber downstream of the inlet, and a flow restricting orifice downstream of the discharge chamber. The valved spray nozzle opens by the pressure at the inlet rising above an upper limit and closes by the pressure at the inlet falling below a lower limit. The pressure of the discharge chamber urges the valved spray nozzle to open.

DESCRIPTION OF THE PREFERRED EMBODIMENT

Figure 1:
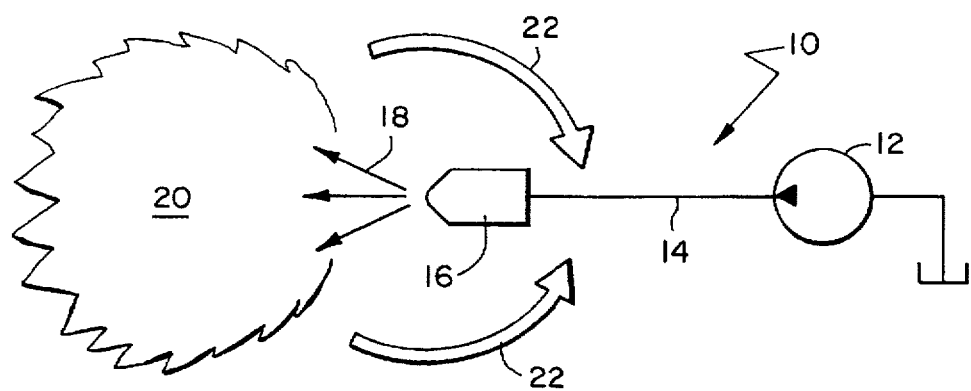
FIG. 1 is a schematic view of a burner system according to the subject invention.

A burner system 10 of FIG. 1 includes a pump 12 discharging fuel oil through a fuel supply line 14 which leads into a generally cylindrical valved nozzle 16. Valved nozzle 16 sprays fuel oil 18 into a combustible atmosphere 20 of air and fuel to generate heat. Some of this heat is conducted and radiated back to nozzle 16 and fuel supply line 14 as indicated by arrows 22.

Figure 2:
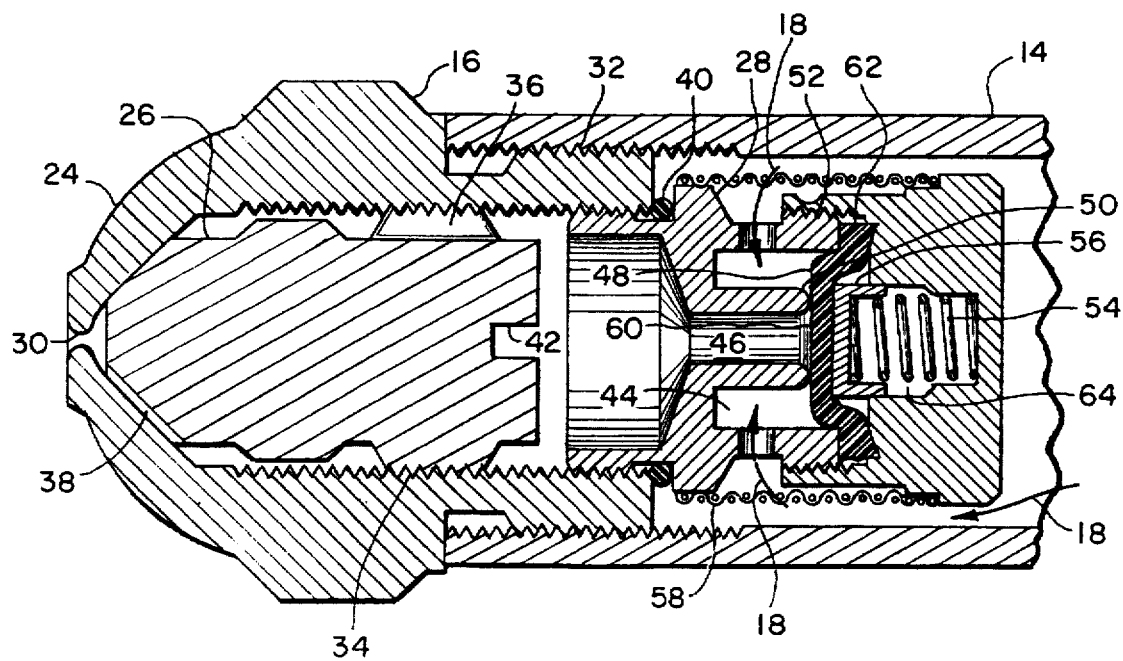
FIG. 2 is a cross-sectional view of a closed valved spray nozzle.

Referring to FIG. 2, valved nozzle 16 includes a nozzle 24, a conical flow director 26, and a valve body 28. At one end, nozzle 24 has a flow restricting orifice 30 of a specific cross-sectional area. At the opposite end, nozzle 24 has external threads 32 for engaging fuel supply line 14.

Conical flow director 26 screws into nozzle 24 via threads 34. A portion of threads 34 are cut away to provide a fluid passageway 36. Flow director 26 includes a few slits 38 that are angled to induce a spiral flow pattern at orifice 30. Items 40 are O-rings, and item 42 is a screw driver slot.

Valve body 28 also screws into nozzle 24. Valve body 28 includes an inlet 44, a discharge chamber 46, a valve element 48, a valve seal 50 (valve sealing surface), a threaded pressure adjustment 52, a spring 54, a spring retainer 56, and a filter screen 58. In this embodiment of the invention, valve element 48 is a flexible diaphragm 60. An outer perimeter 62 of diaphragm 60 is pinched sealingly tight by valve body 28 by way of pressure adjustment 52. This establishes a hermetically sealed chamber 64 containing a gas, e.g., air. The term "hermetically sealed" used herein and below refers to being sealed without having to rely on a sliding seal surface. Spring 54, guided by spring retainer 56, pushes diaphragm 60 to a closed position to separate inlet 44 from discharge chamber 46.

Figure 3:
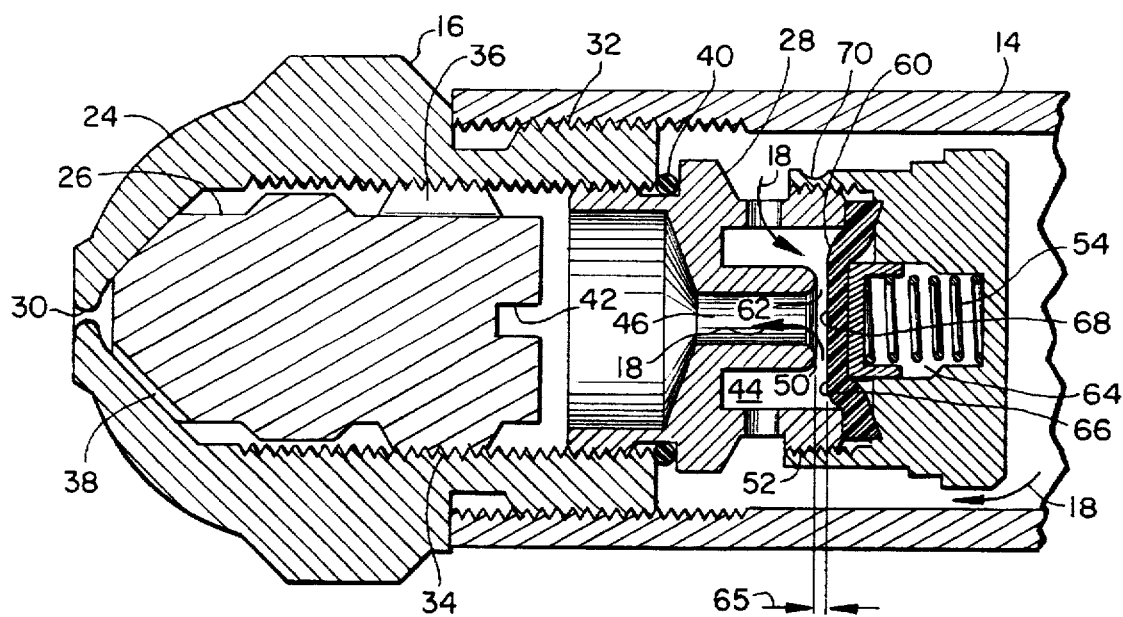
FIG. 3 is a cross-sectional view of an open valved spray nozzle.

When pump 12 is off, fuel oil 18 is trapped between pump 12 and valve seat 50. When pump 12 delivers fuel oil at a pressure that exceeds a predetermined upper limit, the inlet fluid pressure at inlet 44 forces diaphragm 60 away from valve seat 50 to an open position as shown in FIG. 3. This creates a valve gap 62 having a cross-sectional area-equal to a distance 65 between diaphragm 60 and valve seat 50 multiplied by the circumference of valve seat 50. Fuel oil 18 travels through valve gap 62 into discharge chamber 46, past conical flow director 26 through orifice 30, and sprays into combustible atmosphere 20 where it is ignited.

Orifice 30 provides a flow restriction that causes the pressure in discharge chamber 46 to rise. The cross-sectional area of gap 62 is significantly larger than the cross-sectional area of orifice 30 so that the pressure in chamber 46 is closer to the pressure at inlet 44 than the atmosphere pressure of combustible atmosphere 20. It has been found that the cross-sectional area of gap 62 must be at least 10% greater than the cross-sectional area of orifice 30.

The pressure of chamber 46 acts upon diaphragm 60 to help hold it open. Therefore, the pressure at inlet 44 must drop to a predetermined lower limit for diaphragm 60 to close. The difference between the upper limit to open and the lower limit to close provides a discrete deadband. The deadband provides abrupt opening and closing at the upper and lower limits. This avoids hesitant partial opening and closing which can lead to small leakage flow rates. It has been found that the best operation occurs when the upper limit is at least 10% greater than the lower limit. This is achieved by selection of the cross-sectional area of orifice 30, cross-sectional area 62 and the selection of the ratio of the inlet area to the discharge area, i.e., the area of diaphragm 66 exposed to the inlet pressure to the area of diaphragm 68 exposed to the discharge pressure of chamber 46. In one embodiment of the invention, the cross-sectional area of orifice 30 is approximately 0.0001 square inches, the area of diaphragm 66 exposed to the inlet pressure is approximately 0.04 square inches, and the area of diaphragm 68 exposed to the discharge pressure of chamber 46 is approximately 0.01 square inches.

The upper limit at which valved nozzle 16 opens is a function of the force that spring 54 exerts against diaphragm 60 and the area of diaphragm 66 that is exposed to the pressure of inlet 44. The upper limit is adjustable by way of pressure adjustment 52. The further pressure adjustment 52 is screwed together, the greater the spring force and the higher the upper limit. Once properly adjusted, the threads of pressure adjustment 52 are locked by staking as indicated by deformation 70. As an alternative, the threads can be locked by an adhesive.

Figure 4:
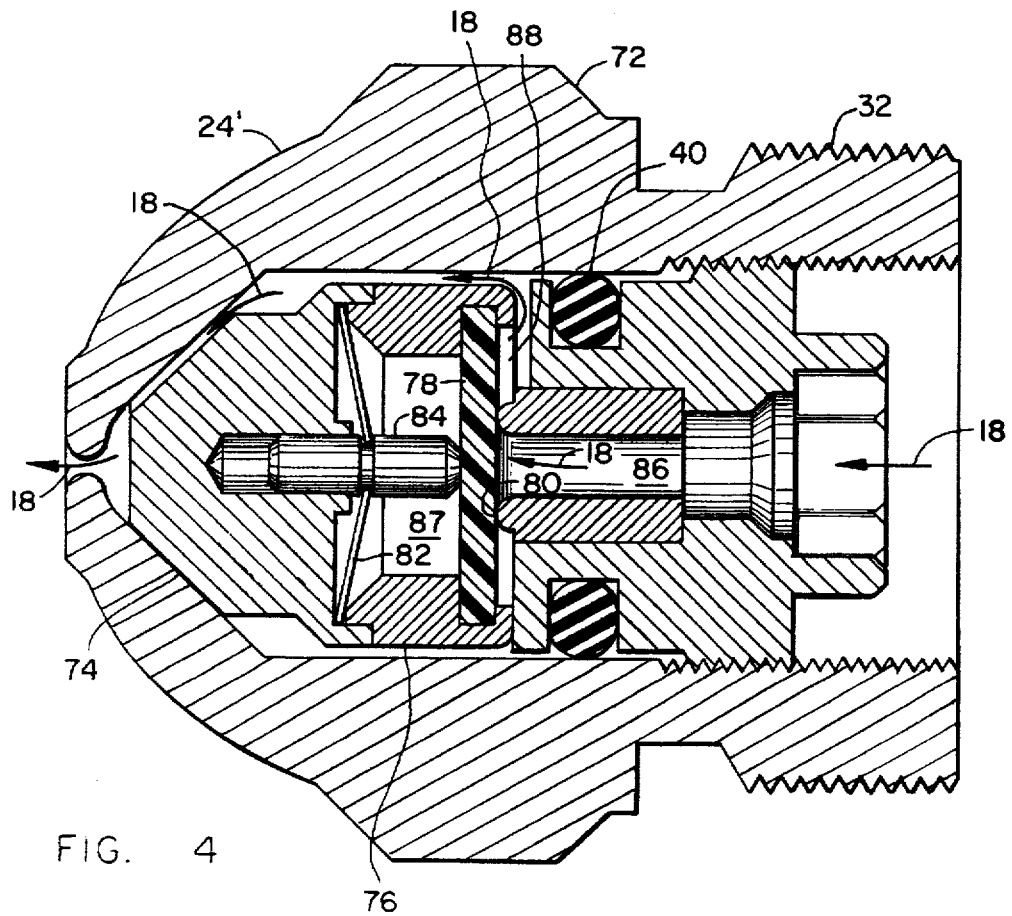
FIG. 4 is a cross-sectional view of another embodiment of the invention.

FIG. 4 illustrates an alternate valved nozzle 72 (in closed position) where a conical flow director 74 and valve body 76 are combined and recessed within nozzle 24'. In addition, a diaphragm 78 is forced against a valve seat 80 by way of a snap spring 82 acting on a plunger 84. The axial force exerted by snap spring 82 is greater when plunger 84 is extended in the closed position as shown than when plunger 84 is retracted in an open position. When the pressure at an inlet 86 exceeds an upper limit, it pushes diaphragm 78 away from valve seat 80 which allows passage into a discharge chamber 88 as indicated by flow arrows 18. Sealed chamber 87 contains a compressible gas.

Figure 5:
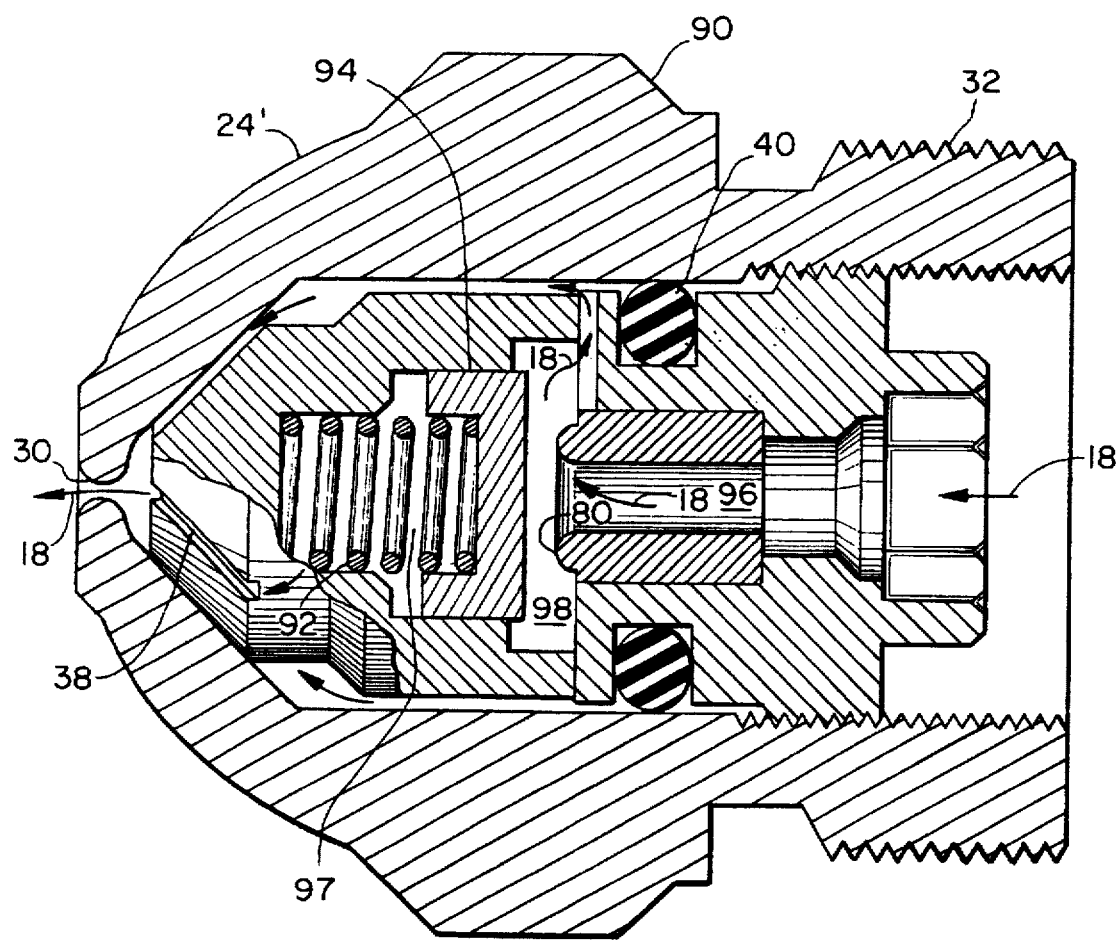
FIG. 5 is a cross-sectional view of yet another embodiment of the invention.

FIG. 5 shows a valved nozzle 90 (in open position) that uses a spring 92 and piston 94 (valve element) instead of snap spring 82 and diaphragm 78 of FIG. 4. In this example, the upper limit to open valved nozzle 90 is greater than the lower limit to close valve nozzle 90 by virtue of the change in surface area of piston 94 that is exposed to a pressure that is substantially close to the pressure at an inlet 96. A discharge chamber 98 is the fluid passageway between valve seat 80 and orifice 30. The flow is generally depicted by arrows 18. Chamber 97 contains air.

Although the invention is described with respect to a preferred embodiment, modifications thereto will be apparent to those skilled in the art. Therefore, the scope of the invention is to be determined by reference to the claims which follow.

I claim:

1. A method of controlling the flow of a liquid through a valved spray nozzle having an orifice of a first cross-sectional area, a valve element movable between an open position and a closed position wherein said open position, said valve element is spaced apart from a valve sealing surface to define therebetween a valve gap having a second cross-sectional area and wherein said closed position said valve element is against said valve sealing surface, said valved spray nozzle defining an inlet upstream of said valve sealing surface, a discharge chamber downstream of said valve sealing surface and upstream of said orifice, and a discharge atmosphere downstream of said orifice, said discharge atmosphere being at a discharge atmospheric pressure, said valve element having an inlet area exposed to an inlet pressure of said inlet, said valve element having an outlet area exposed to a discharge pressure of said discharge chamber, said method comprising the steps of:

defining a predetermined upper limit and a predetermined lower limit with said predetermined upper limit being appreciably greater than said predetermined lower limit thereby defining a discrete deadband therebetween;

urging said valve element to said open position by way of said inlet pressure;

urging said valve element to said open position by way of said discharge pressure;

raising said inlet pressure substantially above said atmospheric pressure and above said predetermined upper limit;

moving said valve element from said closed position to said open position in response to said inlet pressure exceeding said predetermined upper limit;

raising said discharge pressure to be substantially closer to said inlet pressure than said discharge atmospheric pressure as a result of said inlet pressure being substantially greater than said discharge atmospheric pressure and said second cross-sectional area being substantially greater than said first cross-sectional area;

reducing said inlet pressure to a level substantially less than said predetermined upper limit but above said predetermined lower limit while leaving said valve element in said open position substantially solely by way of a combined effort of said inlet pressure and said discharge pressure acting upon said valve element;

reducing said inlet pressure below said predetermined lower limit to allow said valve element to move to said closed position;

reducing said discharge pressure to be substantially equal to said discharge atmospheric pressure;

pointing said valved spray nozzle in substantially the same direction as said liquid enters said valved spray nozzle; and compressing a gas within a hermetically sealed chamber upon moving said valve element from said closed position to said open position.

* * * * *